United States Patent
Peterson et al.

(10) Patent No.: US 9,671,839 B2
(45) Date of Patent: Jun. 6, 2017

(54) INFORMATION HANDLING SYSTEM DYNAMIC ACOUSTICAL MANAGEMENT

(71) Applicant: Dell Products L.P., Round Rock, TX (US)

(72) Inventors: Chris E. Peterson, Austin, TX (US); Hasnain Shabbir, Round Rock, TX (US); Paul T. Artman, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 570 days.

(21) Appl. No.: 13/837,128

(22) Filed: Mar. 15, 2013

(65) Prior Publication Data

US 2014/0277818 A1    Sep. 18, 2014

(51) Int. Cl.
G06F 19/00    (2011.01)
G06F 1/20     (2006.01)

(52) U.S. Cl.
CPC .......... G06F 1/206 (2013.01); *Y02B 60/1275* (2013.01)

(58) Field of Classification Search
CPC .. G06F 1/206; G06F 11/3051; G06F 11/3058; G06F 1/20; G06F 1/3203; G06F 1/324; G06F 1/3293; G06F 1/3296
See application file for complete search history.

(56) References Cited

U.S. PATENT DOCUMENTS

| | | | |
|---|---|---|---|
| 6,442,700 B1 | 8/2002 | Cooper | |
| 7,451,332 B2 | 11/2008 | Culbert et al. | |
| 7,809,965 B2 * | 10/2010 | Ziarnik | G06F 1/206 165/121 |
| 8,191,793 B2 | 6/2012 | Byquist et al. | |
| 8,212,501 B2 | 7/2012 | Artman et al. | |
| 8,237,386 B2 | 8/2012 | Culbert et al. | |
| 2003/0234630 A1 * | 12/2003 | Blake | F04D 27/004 318/471 |
| 2005/0128700 A1 * | 6/2005 | Alperin et al. | 361/687 |
| 2006/0168975 A1 * | 8/2006 | Malone et al. | 62/180 |
| 2006/0253633 A1 | 11/2006 | Brundridge et al. | |
| 2007/0268462 A1 * | 11/2007 | Shih et al. | 353/60 |
| 2008/0278905 A1 | 11/2008 | Artman et al. | |
| 2010/0094582 A1 * | 4/2010 | Cox | G01K 7/42 702/130 |
| 2010/0194321 A1 * | 8/2010 | Artman | G06F 1/206 318/454 |
| 2010/0321881 A1 * | 12/2010 | Ziarnik et al. | 361/679.48 |
| 2011/0090087 A1 * | 4/2011 | Berke et al. | 340/584 |
| 2011/0176275 A1 * | 7/2011 | Sato | 361/695 |
| 2012/0140402 A1 * | 6/2012 | Mizumura et al. | 361/679.33 |

(Continued)

*Primary Examiner* — Darrin Dunn
(74) *Attorney, Agent, or Firm* — Terrile, Cannati, Chambers & Holland, LLP; Robert W. Holland

(57) ABSTRACT

Acoustics management at an information handling system provides reduced acoustic noise with limited performance impact by dynamically changing power dissipation as a function of cooling fan speed and ambient temperature so that preemptive power restrictions prevent excessive thermal conditions that lead to excessive cooling fan speeds and associated acoustics. A maximum cooling fan speed of less than an available maximum is set and maintained by reducing power dissipation unless power dissipation reaches a minimum, after which the minimum power dissipation is maintained and cooling fan speed is allowed to increase.

14 Claims, 2 Drawing Sheets

(56) References Cited

U.S. PATENT DOCUMENTS

| | | | |
|---|---|---|---|
| 2012/0221872 A1* | 8/2012 | Artman | H05K 7/20836 |
| | | | 713/320 |
| 2012/0224322 A1 | 9/2012 | Artman et al. | |
| 2012/0275610 A1* | 11/2012 | Lambert et al. | 381/56 |
| 2013/0060510 A1* | 3/2013 | Cox et al. | 702/130 |
| 2013/0098599 A1* | 4/2013 | Busch | H05K 7/20209 |
| | | | 165/294 |
| 2013/0168058 A1* | 7/2013 | Chamseddine et al. | 165/104.26 |
| 2013/0254563 A1* | 9/2013 | Culbert et al. | 713/300 |
| 2013/0344794 A1* | 12/2013 | Shaw et al. | 454/258 |
| 2014/0032011 A1* | 1/2014 | Artman | G05D 23/1932 |
| | | | 700/300 |
| 2014/0073234 A1* | 3/2014 | Elison et al. | 454/184 |
| 2014/0277821 A1* | 9/2014 | Rubenstein | 700/300 |
| 2015/0005946 A1* | 1/2015 | Haridass | G06F 1/206 |
| | | | 700/275 |
| 2015/0005949 A1* | 1/2015 | Haridass | G06F 1/206 |
| | | | 700/275 |

* cited by examiner

INFORMATION HANDLING SYSTEM DYNAMIC ACOUSTICAL MANAGEMENT

BACKGROUND OF THE INVENTION

Field of the Invention

The present invention relates in general to the field of information handling system thermal management, and more particularly to information handling system dynamic acoustical management.

Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are typically built from a variety of components that are assembled into a housing. Many of the components run on electrical power and generate heat as a byproduct of power consumption. One example is the central processing unit (CPU), which consumes greater amounts of power under increased processing loads and also produces greater amounts of thermal energy as power consumption increases. Typically, the CPU generates the greatest amount of thermal energy in an information handling system housing, however, other components also contribute in varying degrees under different operating conditions. Generally, information handling systems use a cooling fan to remove the excess thermal energy from the housing. Temperature sensors in the housing measure thermal conditions so that a cooling fan controller runs a cooling fan at a speed that is adequate to maintain components within thermal parameters. Failure to maintain components within thermal parameters can result in component failure. If a cooling fan runs at full speed and still cannot maintain the housing temperature within thermal parameters, components within the housing will enter a reduced power consumption mode to reduce the amount of thermal energy that they generate, such as throttling of the CPU to run at a slower clock speed.

As the feature sets available for use in information handling systems increase in capabilities and power consumption, such as increased speeds for CPU, memory and graphics systems, increasingly powerful cooling fans have been included in information handling system housings to provide improved thermal transfer with more rapid cooling airflows. One difficulty with the use of more powerful cooling fans is that housings have tended to shrink in size as processing components have increased in power so that more powerful fans still struggle to generate adequate cooling airflow in housings that have greater impedance to airflow. An associated difficulty is that high cooling airflows in high impedance housings tend to have relatively large acoustical signatures. A large acoustical signature is particularly problematic when an information handling system is located in close proximity to an end user and placed under a heavy processing load. In many systems, running a cooling fan at higher speeds may allow better CPU performance, such as increased time in a turbo mode, but performance benefits and corresponding power and acoustic penalties due to higher fan speeds may far outweigh the performance benefits.

SUMMARY OF THE INVENTION

Therefore a need has arisen for a system and method which adjusts power dissipation as function of fan speed and thermal conditions to manage information handling system acoustics.

In accordance with the present invention, a system and method are provided which substantially reduce the disadvantages and problems associated with previous methods and systems for managing information handling system acoustics. Power dissipation dynamically changes as a function of information handling system thermal parameters and cooling fan speed setting so that restricting power provides reduced cooling fan speeds to achieve acoustical targets.

More specifically, an information handling system processes information with execution of instructions at a processor. The processor consumes electrical power and creates thermal energy as a byproduct of processing information, with the amount of thermal energy increasing as power dissipation increases. A cooling fan generates a cooling airflow to maintain a thermal parameter within a housing of the information handling system. An acoustics manager associated with a fan controller manages cooling fan speed to achieve an acoustic target by capping cooling fan speed and reducing CPU power dissipation to maintain the cooling fan speed cap. A minimum power setting floor limits reductions to CPU power dissipation so that a minimum CPU performance is ensured. If the minimum power setting is reached and the maximum cooling fan speed acoustical target is also reached, the acoustical cooling fan speed target is removed to allow increases in cooling fan speed as needed to achieve thermal parameters in the information handling system housing. In some conditions, the acoustical target is disregarded as unnecessary or impractical, such as when an end user is not proximate to the information handling system or when outside air temperatures exceed a limit that makes cooling difficult.

The present invention provides a number of important technical advantages. One example of an important technical advantage is that power dissipation adjusts as a function of cooling fan speed and thermal conditions for improved management of acoustics generated by an information handling system. Static power management can reduce thermal conditions within a housing, resulting in reduced acoustics; however, power management impacts system performance in a rapid manner while the thermal response is delayed. In order to avoid excessive performance impacts by component throttling to attain thermal parameters for acoustic management, power management is applied to balance acoustic, reliability and system power expectations. Reducing the occurrence of thermal conditions that lead to power throttling reduces over compensation of power consumption to reduce excessive thermal conditions so that excessive performance impacts do not occur. In one example embodiment, relatively minor preemptive power reductions, such as reductions of 15%, have minimal impact on processing performance yet prevent excessive acoustics.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Acoustics associated with operation of an information handling system are managed by dynamically adjusting component power dissipation as a function of cooling fan speed and ambient temperature. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
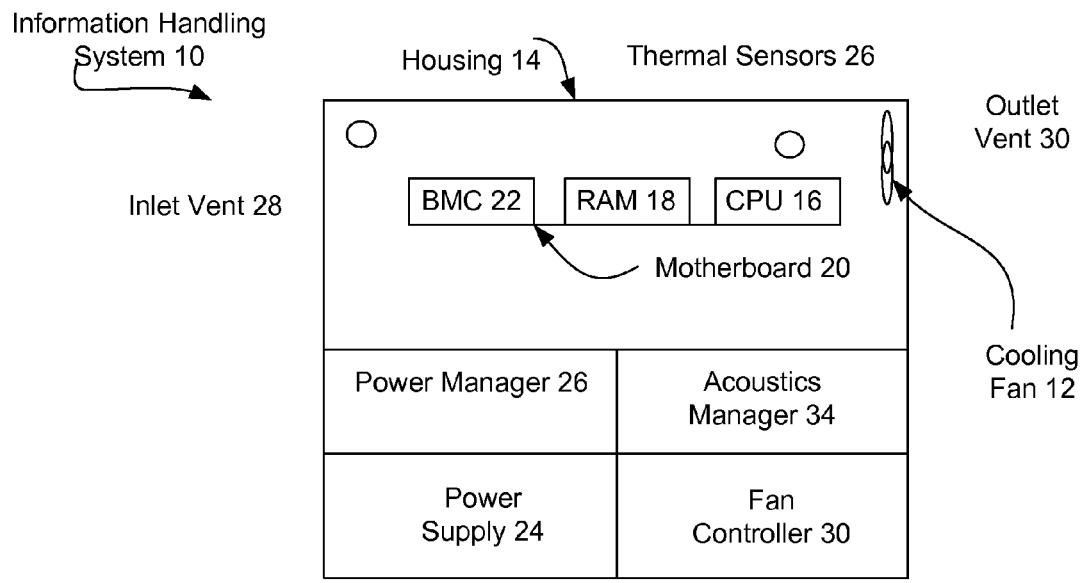
FIG. 1 depicts a block diagram of an information handling system having acoustics management associated with a cooling fan.

Referring now to FIG. 1, a block diagram depicts an information handling system 10 having acoustics management associated with a cooling fan 12. Information handling system 10 processes information with plural components disposed in a housing 14. For instance, in the example embodiment depicted by FIG. 1, information handling system 10 is a server system that processes information with a CPU 16 that executes instructions stored in a RAM memory 18 through an interface provided by a motherboard 20. A baseboard management controller (BMC) 22 provides remote management of CPU 16, such as remote startup and shutdown. In alternative embodiments, alternative configurations of components may be used in alternative types of housing 14 to perform alternative functions, such as for use as a desktop or portable information handling system. The components operate under the management of an operating system executing on CPU 16, such as WINDOWS or LINUX.

During normal operations, components of information handling system 10 create heat as a byproduct of power dissipation. For example, a power supply 24 under the control of a power manager 26 provides regulated direct current power to the components in support of information processing, such as executing instructions on CPU 16 and storing information in RAM 16. Power manager 26 allocates power to components within housing 14 to ensure that the power use by the components remains within the limits of power supply 24. For example, if motherboard 20 has plural CPUs 16, power manager 26 selectively throttles one or more CPUs to keep power consumption within a range supported by power supply 24. As power dissipated by the components increases, the amount of thermal energy released also increases, resulting in increased temperatures within housing 14. In order to maintain housing temperatures within constraints that prevent failure of components, a cooling fan 12 generates a cooling airflow from an inlet vent 28, over the components, and out an outlet vent 30. The speed at which a cooling fan spins is managed by a fan controller 30 interfaced with one or more thermal sensors 32. Increased cooling fan speed provides greater thermal transfer from within housing 14 to the exterior of housing 14. However, increased cooling fan speed increases acoustics of information handling system 10, which can be a distraction to an end user.

An acoustics manager 34 manages acoustics associated with information handling system 10 by adjusting the speed at which cooling fan 12 spins. For instance, acoustics manager 34 is firmware logic executing on one or more of fan controller 30, power manager 26 and/or BMC 22 that dynamically changes power dissipation as a function of cooling fan speed and ambient temperature as measured by thermal sensor 32. Acoustics manager 34 caps power dissipation as cooling fan speed approaches an acoustical limit and manages power dissipation to keep cooling fan speed within the acoustical limit. For heavy processing loads with high power dissipation by CPU 16 with high associated thermal energy release and cooling fan speeds, acoustical benefits from reducing power provided to CPU 16 are relatively high for a relatively limited impact on processing capability due to reduced power provided to CPU 16.

Acoustics manager 34 coordinates power settings for CPU 16 with power manager 26 so that fan controller 30 maintains a speed of cooling fan 12 below a desired acoustics constraint, such as 85% of a maximum available speed. Acoustics manager 34 measures power at CPU 16 and compliance with CPU 16 thermal requirements to adjust CPU power, change fan speeds or a combination of the two as needed to meet CPU thermal requirements and system acoustical requirements. Acoustics manager 34 compares CPU 16 power and temperature measurements against expected measurements based upon a processor identifier retrieved from CPU 16 so that fan speed settings and power capping settings provide desired temperature, performance and fan speed ranges and acoustical requirements. For instance, fan speed is set at a maximum speed of less than a maximum available speed and maintained with reduction of power provided to CPU 16 down to a minimum power level. Once the minimum power level is reached for CPU 16, fan speed is allowed to increase to maintain thermal parameters. Acoustics manager 34 disables power and fan speed caps to provide a desired minimum processor performance under predetermined circumstances. For instance, if a thermal sensor 32 detects relatively high ambient air temperatures at inlet vent 28, acoustics manager 34 removes cooling fan speed caps. Acoustics manager 34 provides control of CPU 16 power within user defined or configured power values to meet CPU thermal requirements with a cap on cooling fan speed that reduces the overall system acoustics.

Figure 2:
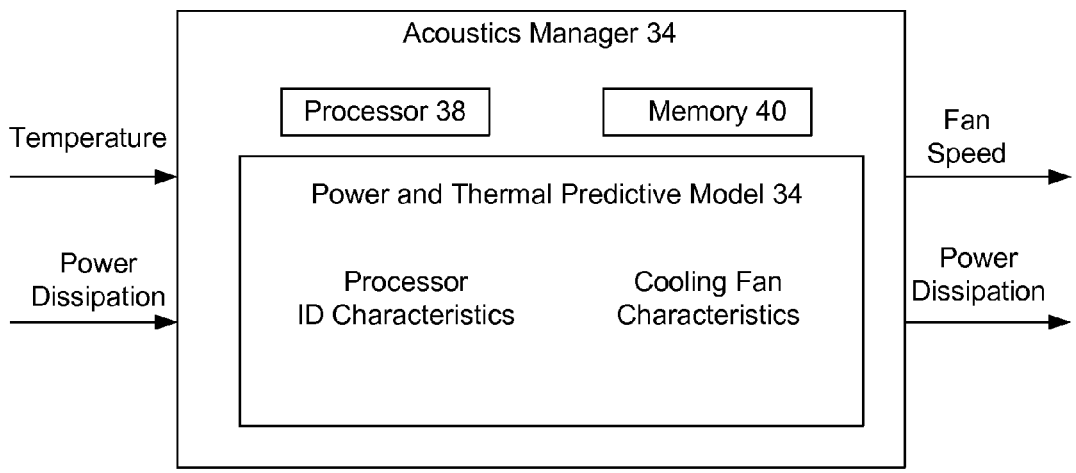
FIG. 2 depicts a block diagram of an acoustics manager that dynamically changes power dissipation as a function of cooling fan speed and ambient temperature.

Referring now to FIG. 2, a block diagram depicts an acoustics manager 34 that dynamically changes power dissipation as a function of cooling fan speed and ambient temperature. Acoustics manager 34 has a processor 38 to execute instructions and a memory 40 to store the instructions. The instructions in memory 40 include a power and thermal predictive model that applies processor identifier characteristics and cooling fan characteristics to output a cooling fan speed and CPU power dissipation level for maintaining a desired system acoustics. For instance, power and thermal predictive model 34 accepts temperatures from sensors of information handling system 10 and power dissipation for CPU 16 to predict a thermal state that will result and takes preemptive action for setting power dissipation to limit the impact of changes in power on CPU 16 performance. Since power dissipation settings have a relatively rapid impact on CPU performance with a relatively slow thermal response, preemptively setting CPU power to prevent over temperatures from occurring limits the need for drastic and short term decreases in CPU power. For instance, power and thermal predictive model 34 provides a relatively stable first-order control system that encourages gradual adjustments to CPU power dissipation to prevent a need for rapid thermal responses that would require large CPU power decreases and increases of fan speed over acoustical settings.

Figure 3:
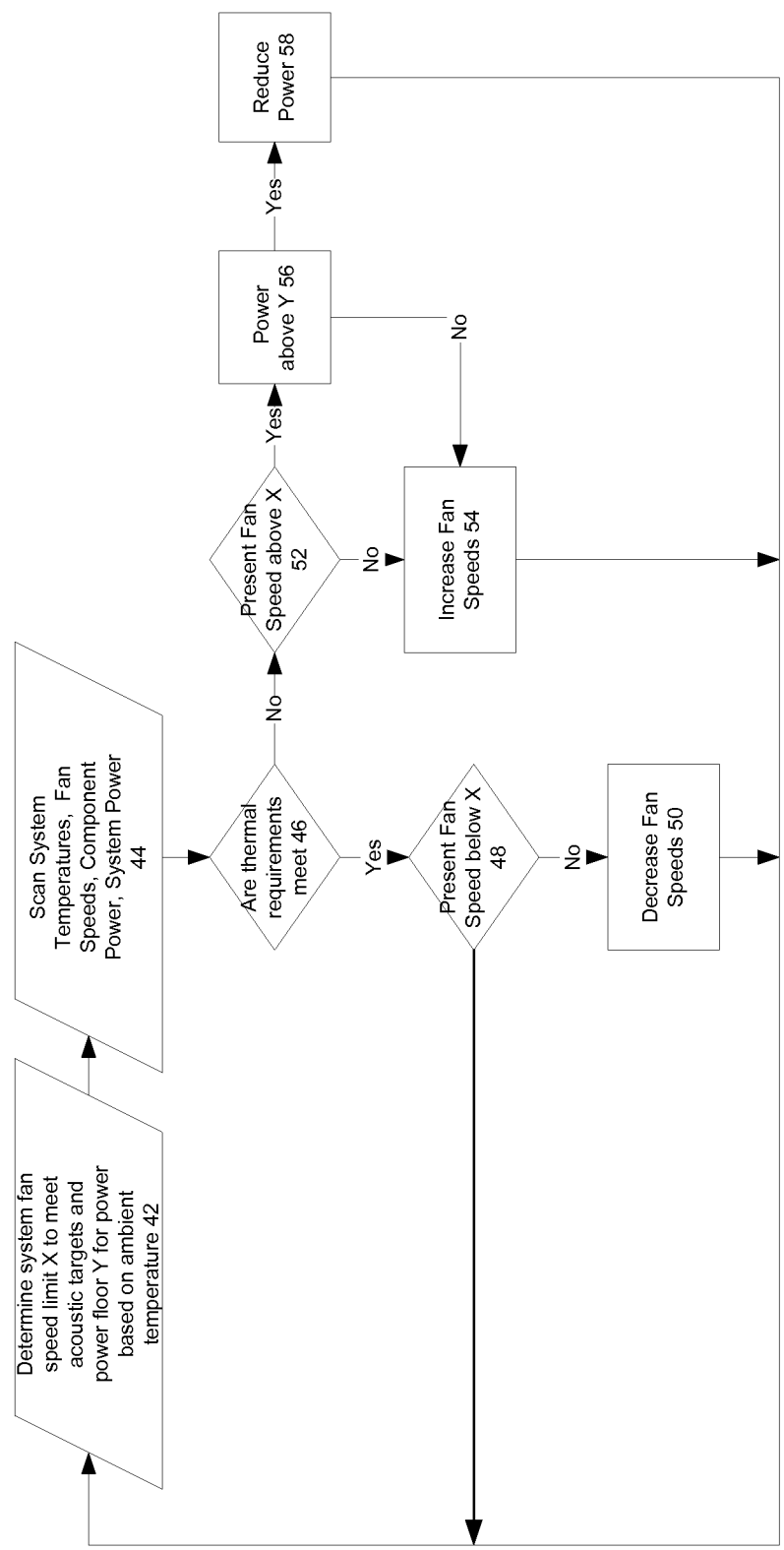
FIG. 3 depicts a flow diagram of a process for dynamically changing power dissipation as a function of cooling fan speed and ambient temperature.

Referring now to FIG. 3, a flow diagram depicts a process for dynamically changing power dissipation as a function of cooling fan speed and ambient temperature. The process begins at step 42 with a determination of a fan speed limit X to meet an acoustical target (a maximum desired noise level), and a determination of a power dissipation floor Y to maintain a minimum processor performance level. For instance, the maximum allowed cooling fan speed is set at 85% of the available cooling fan speed and the minimum power dissipation is set at 85% of the available CPU performance. At step 44, the information handling system is scanned to determine sensed temperatures, current fan speed settings, component power dissipation and system power use. The process then continues to step 46 to determine if thermal requirements are met. If thermal requirements are met, the process continues to step 48 to determine if the present cooling fan speed falls below X, the acoustic target. If the acoustic target is met, the process returns to step 42. If at step 48 the acoustic target is not met, the process continues to step 50 to decrease the fan speed for improved acoustics and returns to step 42.

If at step 46 thermal requirements are not met, the process continues to step 52 to determine if the cooling fan speed is above the acoustics target X. If not, the process continues to step 54 to increase cooling fan speed and returns to step 42 to continue system monitoring. If at step 52 the cooling fan speed setting is above the acoustics target X, the process continues to step 56 to determine if power dissipation is above the power dissipation floor Y. If the power dissipation is above the floor Y, the process continues to step 54 to increase cooling fan speed above the acoustics target in an attempt to decrease system thermal without further decreasing system performance. If at step 56 power dissipation is above the floor Y, the process continues to step 58 to reduce the power dissipation in an attempt to control system thermals without increasing cooling fan speed. The process then returns to step 42 to continue system monitoring. Acoustic targets are thus balanced with system performance so that end user impacts are minimized both in disruption from excessive noise and underperformance.

Although the present invention has been described in detail, it should be understood that various changes, substitutions and alterations can be made hereto without departing from the spirit and scope of the invention as defined by the appended claims.

What is claimed is:

1. An information handling system comprising:
a housing having an intake vent for accepting external air into the housing;
plural components disposed in the housing and operable to cooperate to process information;
a cooling fan disposed in the housing and operable to spin at varying speeds to transfer thermal energy from the housing with a cooling airflow proximate at least some of the components;
a thermal sensor operable to determine thermal conditions of the housing including at least an intake vent temperature;
a power manager operable to manage power applied to the plural components; and
a fan controller interfaced with the cooling fan, the thermal sensor and the power manager, the fan controller operable to adjust power dissipation of power by the power manager as a function of cooling fan speed and housing thermal conditions to selectively maintain cooling fan speed within a predetermined acoustical limit, the fan controller predicting a thermal state from the housing thermal conditions and power dissipation to preemptively set power dissipation to maintain the cooling fan speed within the predetermined acoustical limit; and
an environmental monitor operable to detect an environmental factor, wherein the fan controller applies the environmental factor to disable the predetermined acoustical limit and wherein the environmental monitor comprises the thermal sensor associated with the intake vent temperature, the fan controller disabling the predetermined acoustical limit at a predetermined intake vent air temperature.

2. The information handling system of claim 1 wherein the fan controller adjusts power dissipation to a CPU component to maintain a cooling fan speed of at least a predetermined amount less than a maximum available speed.

3. The information handling system of claim 2 wherein the fan controller adjusts power dissipation at least in part based upon an identifier of the CPU.

4. The information handling system of claim 1 wherein the housing comprises a portable housing.

5. The information handling system of claim 1 wherein the fan controller adjusts power dissipation to not less than a predetermined minimum to maintain a cooling fan speed of at least a predetermined amount less than a maximum available speed, the fan controller allowing a fan speed of greater than the predetermined amount once power is adjusted to the predetermined minimum.

6. The information handling system of claim 5 wherein the fan controller adjusts power dissipation through communication with the power manager.

7. A method for managing acoustics at an information handling system, the method comprising:

setting an acoustical cooling fan speed limit of less than an available maximum cooling fan speed, the acoustical cooling fan speed limit associated with a predetermined acoustical limit;
detecting thermal conditions at the information handling system including at least an intake vent temperature and adjusting the cooling fan speed below the acoustical cooling fan speed limit to maintain predetermined housing thermal conditions;
in response to detecting, managing power dissipation as a function of cooling fan speed and housing thermal conditions to selectively maintain a cooling fan speed within the predetermined acoustical limit, the managing including at least predicting a thermal state based on the housing thermal conditions and power dissipation and preemptively setting power dissipation to manage the cooling fan speed;
detecting a predetermined intake vent temperature; and
disabling the acoustical limit at the predetermined intake vent temperature.

8. The method of claim 7 wherein detecting predetermined thermal conditions further comprises:
monitoring power dissipation by one or more components and a temperature associated with the one more components; and
applying the monitored power dissipation and temperature to predict thermal conditions associated with a cooling fan speed in excess of the acoustical cooling fan speed limit; and
in response to predicting thermal conditions associated with a cooling fan speed in excess of the acoustical cooling fan speed limit, preemptively reducing power dissipation at the one or more components.

9. The method of claim 8 wherein the one or more components comprises a CPU.

10. The method of claim 9 further comprising:
retrieving an identifier from the CPU to a fan controller; and
determining the predetermined thermal conditions at the fan controller based upon a thermal profile associated with the CPU identifier.

11. The method of claim 7 further comprising:
detecting a minimum power dissipation; and
in response to detecting the minimum power dissipation, maintaining at least the minimum power dissipation and allowing greater than the acoustical cooling fan speed limit.

12. The method of claim 7 wherein the information handling system comprises a server.

13. An information handling system acoustics manager comprising:
a processor operable to execute instructions;
a memory operable to store the instructions;
instructions stored in the memory for execution by the processor, the instructions operable to:
set an acoustical fan speed limit of less than an available maximum cooling fan speed, the acoustical cooling fan speed limit associated with a predetermined acoustical limit;
detect thermal conditions at the information handling system including at least an intake vent temperature and adjust the cooling fan speed below the acoustical cooling fan speed limit to maintain predetermined housing thermal conditions; and
in response to detecting, manage power dissipation as a function of cooling fan speed and housing thermal conditions to selectively maintain a cooling fan speed within the predetermined acoustical limit and predict a thermal state from a sensed thermal condition and a power dissipation and preemptively adjust the power dissipation for managing cooling fan speed, the sensed thermal condition including at least an intake vent temperature;
detecting a predetermined intake vent temperature; and
disabling the acoustical fan speed limit at the predetermined intake vent temperature.

14. The information handling system acoustics manager of claim 13 wherein the instructions are further operable to:
set a minimum power dissipation for the one or more components; and
in response to power dissipation at the minimum, allowing cooling fan speeds greater than the acoustical fan speed limit.

* * * * *